May 10, 1966
L. R. BRAYTON
3,251,032
BRAKE FAILURE WARNING DEVICE
Filed Aug. 13, 1963
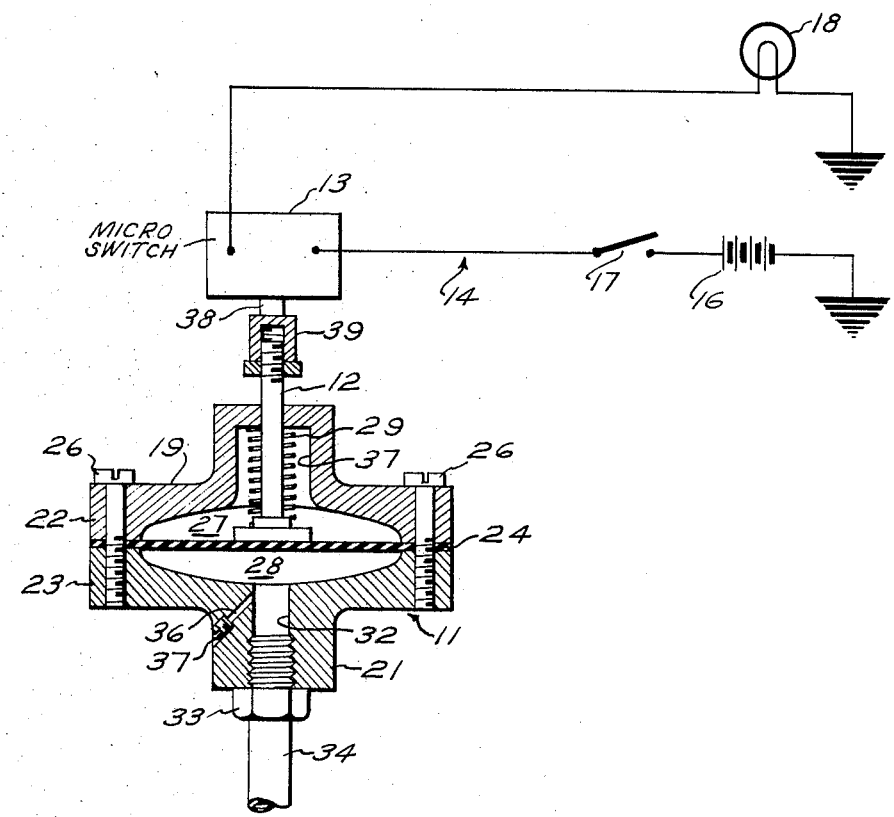
INVENTOR
LAWRENCE R. BRAYTON
BY
Gardner & Zimmerman
ATTORNEYS

United States Patent Office 3,251,032
Patented May 10, 1966

3,251,032
BRAKE FAILURE WARNING DEVICE
Lawrence R. Brayton, P.O. Box 61, St. Helena, Calif.
Filed Aug. 13, 1963, Ser. No. 301,709
2 Claims. (Cl. 340—60)

This invention relates to automobile safety devices in general, and is more particularly directed to a device for indicating the existence of defects in the braking system of an automobile or the like.

In hydraulic brake systems as employed in present day automobiles and other vehicles, a predetermined residual pressure should be maintained in the system to insure proper functioning of the brakes. More particularly, a conventional automobile hydraulic brake system includes sets of brake shoes which are respectively actuated by individual hydraulic cylinders. The cylinders are in turn hydaulically coupled by means of brake lines to a pedal controlled master cyinder which provides the hydraulic pressure required to operate the individual hydraulic cylinders to in turn actuate the brake shoes. When this pressure in the system drops significantly, due to leakage of hydraulic fluid, faulty cylinder operation, etc., an extremely hazardous condition is created. If the pressure drop is not immediately brought to the attention of the operator of the vehicle, the brakes will unexpectedly malfunction when applied by the operator, and a serious accident may result.

It is therefore an object of the present invention to provide a simple and effective warning device which will operate in response to a loss of pressure in a hydraulic brake system to indicate to the operator of the vehicle that a loss of pressure has occurred and therefore the brake system is faulty.

Another object of the invention is the provision of a warning device of the class described which may be easily installed on an automobile and is readily adjustable to operate with the variety of brake systems which may be encountered with different makes of automobiles.

A further object of the invention is to provide a warning device of the class described which may be coupled to a hydraulic brake system of an automobile and connected to the ignition system thereof in such a manner that a light or other indicating device, located on the dash board, for example, is actuated when the hydraulic system pressure drops.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a sectional view, partially in schematic, of a warning system in accordance with the present invention.

Considering now the invention in some detail and referring to the illustrated form thereof in the drawing, the warning system will be seen to generally include hydraulic cylinder means 11 adapted for pressure responsive connection to a hydraulic brake system. The hydraulic cylinder means 11 is provided with a pressure actuated plunger 12 which is movable between normal and actuated positions in response to a drop in the hydraulic pressure of the system below a predetermined safe minimum. The plunger is operatively associated with a micro switch 13, or equivalent switch means arranged for actuation in response to movement of the plunger from normal to actuated position. The micro switch 13 is connected in an indicating circuit 14 which includes the battery 16 and ignition switch 17 of the automobile, an electrically actuated indicator such as a lamp 18, and the micro switch, all in series. Thus, with the ignition switch turned on, a current path is provided from the battery to the lamp, through the micro switch. When the hydraulic brake system pressure is normal, as sensed by the hydraulic cylinder means 11, the plunger 12 is in its normal position and the micro switch is unactuated. Consequently, the micro switch is open and current cannot flow through the lamp 18. The lamp, which may be conveniently mounted on the dash board of the automobile in plain view of the operator, is hence not lit, thereby indicating that the brake system is in a safe operable condition. If the system is defective and the pressure too low, the plunger 12 of the cylinder means 11 is moved to its actuated position, thereby closing the micro switch and effecting current flow through the lamp. The lighted lamp thus warns the operator that the brake system is defective. If the automobile is parked a few hours after being driven and the brakes allowed to cool, the lamp will light as the ignition switch is turned on. However, depression of the brake pedal re-establishes pressure in the brake system and the lamp is extinguished, and remains extinguished, if the brakes are normal. Of course if trouble exists, the lamp will remain lighted subsequent to depression of the brake pedal.

Considering now the pressure sensing hydraulic cylinder means 11 in greater detail as to preferred structure, the cylinder means includes a generally cylindrical housing which is advantageously defined by a pair of separable sections 19, 21. The sections 19, 21 are of substantially cupped configuration and respectively include mateable annular flanges 22, 23. These flanges are concentrically disposed about the hollow interiors of the respective sections and serve to mount a flexible diaphragm 24 therebetween. More particularly, the diaphragm is marginally clamped between the flanges, which are firmly secured together, as by means of threaded fasteners 26. The diaphragm partitions the interior of the housing into two chambers 27, 28 hermetically sealed from each other. The plunger 12 is centrally secured to the diaphragm and extends coaxially through the end of one housing section 19, in slidable relation thereto. A spring 29 concentrically disposed upon the plunger and residing in a well 31 provided in the housing section 19 at the base of chamber 27 then serves to spring load the diaphragm in the direction of chamber 28.

The force exerted upon the diaphragm by spring 29 is arranged to be normally counteracted by fluid pressure supplied to chamber 28 from the hydraulic brake system of a vehicle. In this regard, the housing section 21 is preferably provided with an inlet port 32 in coaxial communication with chamber 28. The port is best internally threaded to receive a nipple fitting 33, or the like, at the end of a tube 34 adapted for connection to a hydraulic brake system. Fluid of the system may be thereby readily communicated with chamber 28 such that the system pressure is applied to this chamber. To facilitate bleeding of the tube 34 and chamber 28, a vent 36 is provided in the housing section 21 in communication with chamber 28, and the vent is normally closed by means of a plug 37.

In the operation of the hydraulic cylinder means 11, the pressure applied to the chamber 28 through tube 34 from a hydraulic brake system opposes the force exerted on diaphragm 24 by the spring 29 in chamber 27. The spring force is such that it is overcome by normal brake system pressure in chamber 28. At this time the plunger 12 is held in a normal extended position by the diaphragm. Moreover, the cylinder means 11 and micro switch 13 are mounted in fixed relation to each other with the plunger 12 engaging the contact button 38 of the switch, preferably through the intermediary of an adjusting nut 39 threadably secured to the end of the plunger. In the normal extended position of the plunger the contact button is depressed to maintain the switch in a normally open condition. Accordingly, the lamp 18 is not lighted. When the system pressure existing in chamber 28 drops to a predetermined low value due to a defect in the brake system, the spring force sufficiently overbalances the pressure supporting the diaphragm that the plunger moves to a retracted actuating position. The contact button 38 of the switch is responsively extended to thereby close the switch and light the lamp. It will of course be appreciated that the adjusting nut 39 may be advanced or retracted to vary the normal extended and retracted actuating positions of the plunger with respect to the contact button of the switch. In this manner the switch may be actuated in response to the existence of varied predetermined pressures in chamber 28 so as to accommodate the different brake systems which may be encountered on various makes of automobiles.

What is claimed is:

1. In combination with an automobile including a hydraulic brake system and an ignition system having a battery connected to an ignition switch, a brake failure warning device comprising opposed generally cylindrical cupped housing sections having mating annular flanges, a diaphragm marginally clamped between said sections and defining therewith a pair of chambers hermetically sealed from each other, means communicably connecting one of said chambers to said hydraulic brake system with said diaphragm subjected to the pressure therein, a plunger secured to said diaphragm for movement therewith and extending in slidable relation through the housing section encompassing said second chamber to the exterior thereof, a spring concentrically disposed about said plunger in said second chamber and acting to urge said diaphragm in the direction of said first chamber in opposition to pressure in said first chamber and moving said plunger from a normal unactuated position to an actuated position in response to a drop of pressure in said chamber to a predetermined low value, a micro switch mounted in fixed position relative to said housing sections, said micro switch having a contact button engaged by said plunger, said micro switch having an open condition when said button is depressed and a closed condition when said button is extended, an indicating lamp, means connecting said lamp, said micro switch, said ignition switch, and said battery in series, and an adjusting nut threadably secured to the end of said plunger which is exterior of said housing and engaging the contact button of said micro switch for changing the effective length of said plunger, whereby said warning device can be adapted to be responsive to drops of pressure to various predetermined low values.

2. A brake failure warning device for indicating the loss of pressure in a hydraulic brake system of a vehicle comprising a housing having a diaphragm mounted therein defining therewith a hermetically sealed chamber, means for communicably connecting said chamber to a hydraulic brake system with said diaphragm subjected to the pressure therein, a plunger secured to said diaphragm for movement therewith and extending from said housing in slidable relation thereto, means spring loading said diaphragm in opposition to pressure in said chamber and moving said plunger from a normal unactuated position to an actuated position in response to a drop of pressure in said chamber to a predetermined low value, a micro switch mounted relative to said housing with a contact button engageable by said plunger and closing said switch when said plunger is moved to said actuated position, electrical warning indicator mountable within the perception of an operator of said vehicle, means for electrically connecting said switch and warning indicator in series with a source of electrical current, and means exterior to said housing for adjusting the amount of plunger movement necessary to reach said actuated position whereby said warning device can be adapted to be responsive to drops of pressure to various predetermined low values.

References Cited by the Examiner

UNITED STATES PATENTS

| 2,694,191 | 11/1954 | Falanga et al. | 340—69 |
| 3,114,320 | 12/1963 | Hughes | 200—83 X |
| 3,148,364 | 9/1964 | Engels et al. | 340—242 |

NEIL C. READ, *Primary Examiner.*

A. H. WARING, *Assistant Examiner.*